Aug. 22, 1933.  C. SMITH  1,923,759
COMBINED CURRENT VALUE AND TOTALIZING DIAL
Filed Aug. 30, 1930   2 Sheets-Sheet 1
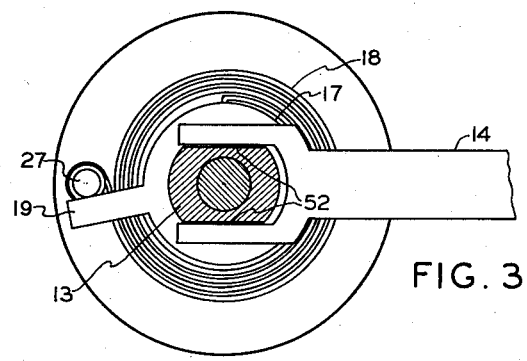
FIG. 3
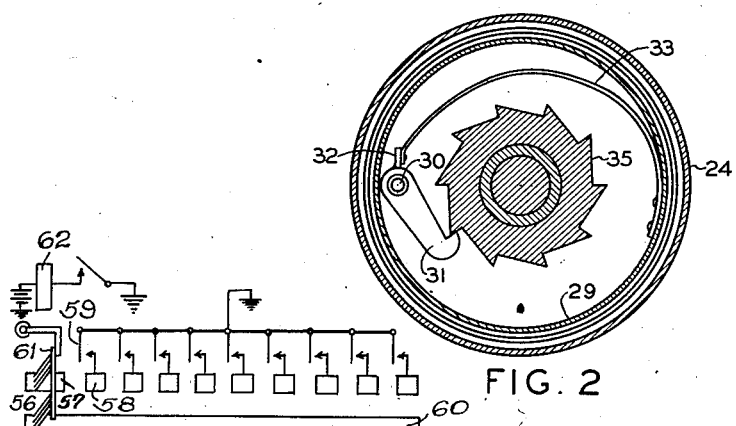
FIG. 2
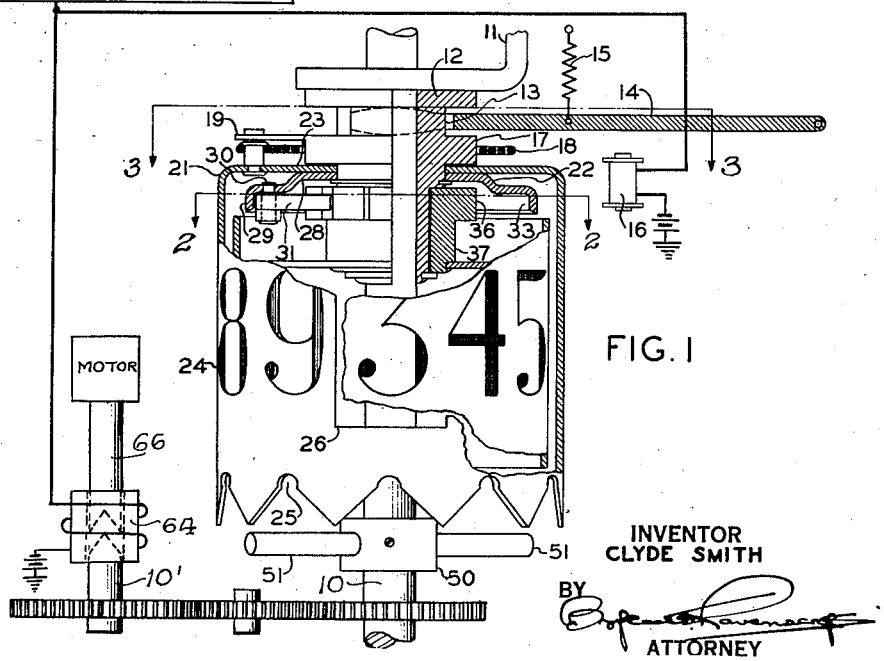
FIG. 1
INVENTOR
CLYDE SMITH
BY
ATTORNEY Aug. 22, 1933.   C. SMITH   1,923,759
COMBINED CURRENT VALUE AND TOTALIZING DIAL
Filed Aug. 30, 1930   2 Sheets-Sheet 2

INVENTOR
CLYDE SMITH
BY
ATTORNEY

Patented Aug. 22, 1933

1,923,759

UNITED STATES PATENT OFFICE 1,923,759

COMBINED CURRENT VALUE AND TOTALIZING DIAL

Clyde Smith, Hopkinsville, Ky., assignor to International Communications Laboratories, Inc., New York, N. Y., a Corporation of New York Application August 30, 1930. Serial No. 478,882

6 Claims. (Cl. 235—92)

The present invention relates to an indicating device for momentarily displaying a numerical indication of the current value of a variable quantity and for indicating during the intervals between such displays of the current value of the variable, the total of all such values displayed during a preceding period.

The device comprises two indicating drums, one nested within the other, the outer drum being arranged to rotate in accordance with the variation in the variable quantity and to return to normal position immediately after such rotation. The inner drum is visible through an opening or window in the outer drum whenever the outer drum is in its normal position. Also the inner drum is arranged to be driven forwardly, by a pawl and ratchet movement, whenever the outer drum moves forwardly and to be maintained in its new position during the subsequent return to normal of the outer drum.

The invention is applicable to the posting of quantity indications in connection with stock sales. When so used the outer drum gives a momentary indication of the quantity of the most recent sale of a particular stock and in the intervals between such displays the visible figure on the inner drum indicates the total sales during the market day.

Broadly considered, the invention is not limited to the registration of quantities involved in stock sales but may be applied to many other uses, as for example, when it is desired to register and display momentarily a function of a total quantity preparatory to displaying the total quantity including said function.

An object of the invention is to provide a momentary display of the current value of a variable quantity.

Another object of the invention is to display, between periods of indication of the current value of the variable, the total of the values of that variable which have been posted during a preceding period.

A further object of the invention is to display both the current and totalized values in approximately the same space which would be occupied by an indicating drum capable of performing one only of the two functions mentioned above.

In the attached drawings, in which like parts are designated by like numerals:

Fig. 1 is an elevation of the indicating device, partly broken away and partly in section.

Fig. 2 is a horizontal section of the device taken on line 2—2 of Fig. 1 in the direction of the arrows.

Fig. 3 is a horizontal section of the device taken on line 3—3 of Fig. 1 in the direction of the arrows.

Figures 4, 5:
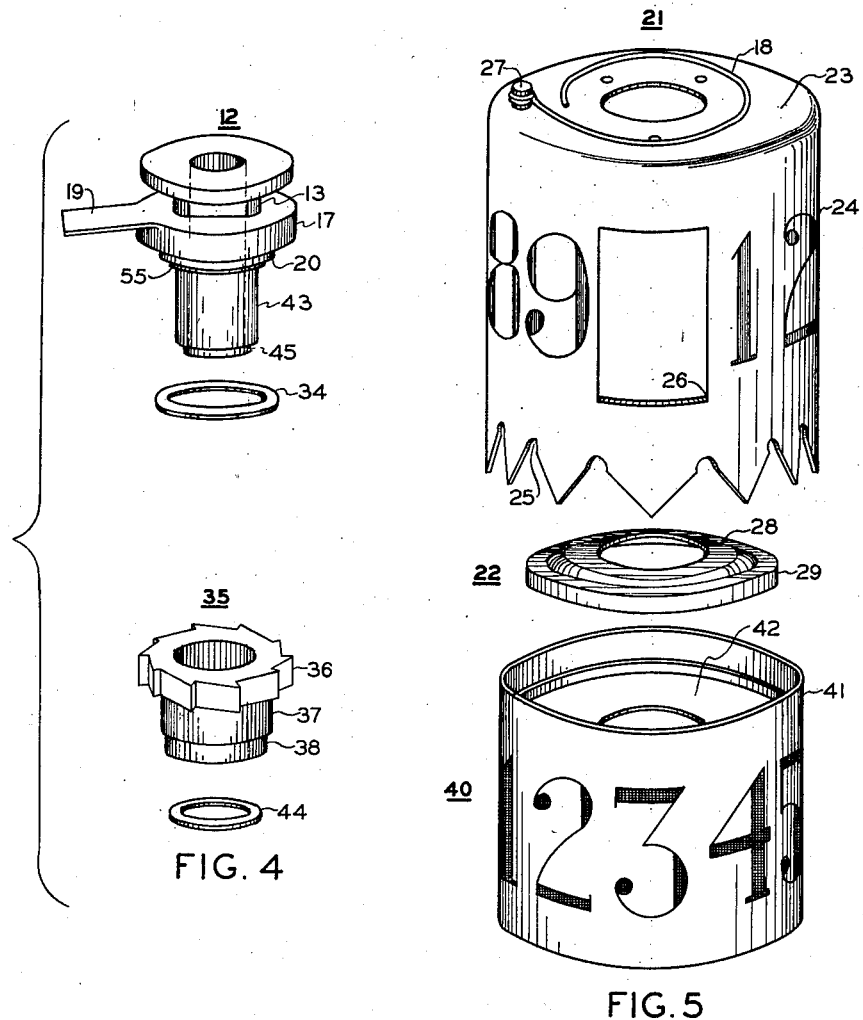
Fig. 4 shows perspective views of several portions of the drum supporting means.
Fig. 5 shows perspective views of the register drums and of the pawl carrying plate.

Referring to Fig. 1, the drive shaft 10 is shown journalled in bracket 11 which is supported in any suitable manner. The shaft 10, as will be described later, is arranged to be rotated to any desired position and then stopped. Slidably mounted on shaft 10 but in no way restraining it from rotation is a hub generally denoted as 12.

Hub 12 is provided with a groove 13 having flattened sides 52. The bifurcated end of an operating lever 14 straddles the flattened sides of groove 13 and serves to restrain hub 12 from rotation as well as to hold it against bracket 11 under tension of spring 15, when magnet 16 is not energized.

Immediately below groove 13 hub 12 is enlarged (Figs. 1, 3 and 4) forming a flange 17 to which one end of spring 18 is fixed. Integral with flange 17 is an arm 19 the purpose of which will be hereinafter disclosed.

At 20 hub 12 is again reduced in diameter to form a bearing surface for a sub-assembly comprising register drum 21 and pawl carrying plate 22. Register drum 21 includes a top 23 and a depending cylindrical skirt 24. The lower margin of skirt 24 has teeth as 25 cut therein. Equally spaced about the circumference of the skirt 24 at about its mid-portion are the numerals 1 to 9 and a window designated as 26. The top 23 of drum 21 carries a pin 27 to which is fastened the other end of spring 18 which was mentioned previously.

Pawl carrying plate 22 has a raised central portion or boss 28 and a depending cylindrical flange 29. Near the outer edge of the plate there is a pin 30 (Fig. 2) on which is pivoted a pawl 31. Pawl 31 has a lug 32 against which the free end of a flat spring 33 bears. The other end of spring 33 is attached to flange 29 at a point diametrically opposite to pin 30. Spring 33 is for the purpose of holding the pawl 30 against the inner dial driving member or ratchet wheel 35.

Pawl carrying plate 22 is rigidly fastened to the under surface of the top 23 of outer register drum 21. A central bore in both the top 23 of the drum 21 and raised portion 28 of the pawl carrying plate 22 provides a bearing surface permitting the sub-assembly to rotate on reduced portion 20 of hub 12.

The sub-assembly comprising drum 21 and plate 22 is held in place on the hub 12 against the flange 17 by a washer 34 which is held by "spun over" portion 55 of hub 12.

Ratchet wheel 35 comprises a toothed portion 36 and an axially extending hub 37 which is reduced in diameter at 38. The ratchet wheel 35 and inner register drum 40 are combined to form another sub-assembly. Register drum 40 comprises hollow metal cylinder 41 having the numerals 1 to 9 and zero evenly spaced on its circumferential surface and a flanged plate 42 inserted within it and fastened rigidly thereto. The plate 42 has a central bore which is placed over reduced portion 38 of the ratchet 35. The portion 38 is then "spun over" to make the drum 40 and ratchet 35 a unitary movable structure.

This assembly is mounted on portion 43 of the hub 12 and is freely rotatable thereon. Ratchet 35 is held in place by washer 44 which is placed on reduced portion 45 of the hub 12, which is then "spun over" thus making a complete assembly. Thus it is apparent that pawl 31 is in line with ratchet wheel 35 against which it is held by action of spring 33.

Fixedly mounted on shaft 10 below the extreme lower edge of skirt 24 of drum 21 is a collar 50 carrying projecting pins 51. Pins 51 are so arranged that when hub 12 is pulled down due to overcoming of tension of spring 15 by the magnetic attraction exerted on operating lever 14 by magnet 16, teeth as 25 mesh with pins 51.

The means for energizing the magnet 16 and then rotating the shaft 10 to the desired position will now be described by reference to Fig. 1.

Start-stop distributor 56 is provided with a brush 61 adapted to be rotated by a motor (not shown) over a segmented ring, including a start segment 57 and other segments 58, and a solid ring 60. The brush is normally held on the start segment 57 by the spring retracted latch of a start magnet 62. The energization of start magnet 62 attracts its latch, freeing the brush for rotation, and at the end of a revolution, the start magnet being then released, the brush is again brought to rest on the start segment 57 by the associated latch.

Individual to each segment 58 of the distributor face is a manually operable key 59. As one side of each key is connected to ground, the operation of the keys serves to connect ground to any number of the segments 58.

Included in parallel circuits adapted to be closed by the distributor brush 61 are operating magnet 16 and a clutch magnet 64. Adapted to be coupled by means controlled by the clutch magnet 64 are the shaft 10' and a shaft 66 driven by the continuously running motor 65. The shaft 10' is operatively coupled to the shaft 10 through the usual gear train.

The distributor 56 is of the type developed by the Western Electric Company which is disclosed in Figs. 194—196 and described on pages 194-196 of Harrison on "Printing telegraph systems and mechanisms". Though the distributor employed in carrying out the invention differs slightly from that disclosed in Harrison, nevertheless its construction may be clearly understood by reference to the disclosure mentioned.

The clutch controlled by the clutch magnet 64 and shown schematically in the drawings may be of any suitable type, as, for example, the clutch disclosed in Fig. 27 and described on page 36 of Harrison. By reference to this disclosure it will be understood that upon the operation of the clutch magnet 64, the shafts 10 and 66 will be coupled together so long as the clutch magnet remains operated, and will be uncoupled upon the release of this magnet.

The operation of the device is as follows:

In order to set the outer drum 21 to display momentarily the numeral 3, the first three keys 59 are depressed, thus connecting ground to the first three distributor segments 58. Then the start key 63 is operated, which energizes the start magnet 62. The start magnet attracts its latch which previously held the brush 61, allowing the brush to be rotated by a motor (not shown). Following this, the brush leaves the start segment 57 and rotates over the segments 58 and the solid ring 60. When the brush again reaches the start segment it is again held by the start magnet latch, as this magnet is now released.

In passing over the first three grounded segments 58, the magnet 16 and the clutch magnet 64 are operated over obvious circuits and held operated, but when the brush 61 leaves the third segment 58 both magnets are shortly afterwards released. It will be understood that the speed of rotation of the brush 61 is sufficiently great to prevent the release of the magnet 16 and the clutch magnet 64 while the brush is traversing the space between adjacent grounded segments 58.

From the foregoing description it is apparent that the operating magnet 16 can be energized, drawing the operating lever 14 down against the tension of spring 15, which carries hub 12 and all other portions of the mechanism downward, thereby seating teeth 25 against pins 51. Shafts 10 and 66 are then coupled together, clutch magnet 64 being somewhat slower to operate and somewhat faster to release than magnet 16. The shaft 10 is then rotated in a clockwise direction by the motor 65 until the brush 61 of the distributor has left the third grounded segment 58. When this occurs, the clutch magnet 64 and the operating magnet 16 are both released. The release of the clutch magnet 64 uncouples shafts 10 and 66, thereby bringing shaft 10 to rest at the desired position. The release of magnet 16 disengages the pin 51 from the teeth 25, and the lever 14, retracted by the spring 15, restores the drums to idle position.

When shaft 10 is rotated it carries drum 21 with it. Drum 40 is also carried clockwise through the same angle due to the engagement of pawl 31 with ratchet wheel 35.

When the drums reach a selected position, which, in this case, is when the outer drum 21 displays the numeral 3, shaft 10 is stopped in the manner previously described and the current value involved in the particular operation is read on the outer drum 21. The operating magnet 16 is deenergized, freeing lever 14 which is drawn upward by spring 15, causing teeth 25 to disengage pins 51.

The tension of spring 18 is against the clockwise rotation of drum 21, consequently the latter drum now being free is rotated counter-clockwise until stop pin 27 strikes stop arm 19. Drum 21 now being at rest in its normal position, the figure indicative of the amount of motion of the totalizer dial 40 is seen through the window 26 of drum 21. Assuming that the numeral 2 was previously displayed by inner drum 40, the outer drum having been positioned to display the numeral 3 momentarily, the inner drum now displays the sum of these numerals, or 5.

To explain more completely the operation of the current and cumulative indicators 21 and 40, respectively, let it be assumed that the device is used for indicating quantities involved in stock sales and that it indicates sales in units of one hundred shares. If the first sale of the day be 200 shares, drum 21 and with it drum 40 will be rotated clockwise until the numeral 2 of drum 21 is in the reading position. This shows the quantity associated with the immediate sale to be 200 shares.

Drum 21 will then be released and will return to normal, bringing window 26 of the outer drum in front of numeral 2 of the inner drum, showing the total sales to be 200 shares.

If then the next sale be 300 shares, drum 21 will be driven clockwise to display the numeral 3 as an indication of the quantity of the second sale. Drum 2 will also move clockwise three steps so that when the outer drum returns to normal the numeral 5 will be seen, indicating a total sale of 500 shares.

In order that the numerals of the inner drum may not be confused with those of the outer drum, different color combinations are used as indicated in the various drawings. For example, in the drawings, register drum 21 is shaded to illustrate red numerals on a white background and register drum 40 is shaded to illustrate black numerals on a white background.

The above disclosure is given by preference for purposes of description only. Therefore, no unnecessary limitations should be understood and the appended claims should be construed as broadly as the state of the art permits.

What is claimed is:

1. In an indicating device, a first indicator for successively displaying predetermined integers, a second indicator cumulatively rotated thereby for displaying an integer equal to the sum of the integers successively displayed on said first indicator, a variably operable shaft for positioning said first indicator, relay controlled means for coupling said first indicator to and uncoupling it from said shaft, means effective upon said uncoupling of the first shaft to restore it to a definite position.

2. In an indicating device, a first indicator for successively displaying predetermined integers, a second indicator, disposed within the first and cumulatively rotated thereby, for displaying an integer equal to the sum of the integers successively displayed on said first indicator, a variably operable shaft for positioning said first indicator, and relay controlled means for coupling said first indicator to and uncoupling it from said shaft.

3. In an indicating device, a first indicator adapted to display successively predetermined integers and to be restored to normal position after the display of each integer, a second indicator, cumulatively rotated by successive rotations of said first indicator, for displaying an integer equal to the sum of all the integers previously displayed by said first indicator whenever the latter is returned to normal position, a variably operable shaft for positioning said first indicator, relay controlled means for coupling said first indicator to and uncoupling it from said shaft, and means effective when said first indicator is uncoupled from said shaft for restoring said first indicator alone to normal position.

4. In an indicating device, a first indicator having a plurality of integers and an aperture thereon, said aperture being normally located at a display position, a second indicator disposed within the first and cumulatively rotatable thereby, said second indicator having a plurality of integers thereon, one of which is visible when positioned behind said aperture in its normal position, a variably operable shaft for rotating said first and second indicators in one direction until a predetermined integer on said first indicator appears at said display position and an integer on said second indicator, equal to the sum of the said integer and the integer previously displayed by said first indicator, is positioned behind the normal position of said aperture, relay controlled means for coupling said first indicator to and uncoupling it from said shaft, and means effective when said first indicator is uncoupled from said shaft for rotating said first indicator alone in the opposite direction until said aperture appears at said display position.

5. In an indicating device, the combination of a first indicator having thereon a plurality of integers and an aperture normally located at a display position, a second indicator, disposed within the first, having a plurality of integers thereon, one of which is visible when positioned behind said aperture, in its normal position, said first indicator being rotatable in either of two directions and said second indicator in one direction only, a variably operable shaft, electromagnetic controlled means for locking said first indicator to and unlocking it from said shaft, means for rotating said shaft in the direction of rotation permitted said second indicator until a predetermined integer on said locked first indicator appears at said display position, means for transmitting the motion of said shaft to said second indicator whereby an integer on the second indicator, equal to the sum of the integers previously displayed by said first indicator, is positioned behind the normal position of said aperture, and means effective when said first indicator is unlocked from said shaft for rotating said first indicator in the opposite direction to return said aperture to its normal position.

6. In an indicating device, the combination of a variably operable shaft, a hub freely mounted thereon, means for preventing rotation of said hub, an indicator freely mounted on said hub, relay controlled means for locking said indicator to and unlocking it from said shaft, said shaft being rotated in one direction, while said indicator is locked thereto, to set said indicator to a predetermined position, and means effective when said indicator is unlocked from said shaft for rotating said indicator in the opposite direction to a position determined by a stop on said stationary hub.

CLYDE SMITH.